3,073,849
PROCESS FOR PRODUCING DIRECT BLACK VAT DYESTUFFS
Maurice H. Fleysher, Buffalo, N.Y., assignor to Allied Chemical Corporation, New York, N.Y., a corporation of New York
No Drawing. Filed Nov. 25, 1959, Ser. No. 855,253
5 Claims. (Cl. 260—354)

This invention relates to an improved process for the production of vat dyestuffs, and more particularly to an improved process for the preparation of nitro and aminodibenzanthrones of a character which dye vegetal fibers gray to black shades of superior jetness and fastness to peroxide treatment.

Aminodibenzanthrones comprise an important group of vat dyestuffs which may be prepared, as is well known, by the general process of nitrating a dibenzanthrone and reducing the nitrated product to the corresponding amine.

It is also known that the aminodibenzanthrones in which the amino groups are attached to the benzene nuclei of the dibenzanthrone, produce green dyeings which must be aftertreated with other agents, such as sodium hypochlorite, nitrous acid and the like, to produce black dyeings. Such aftertreatments are not only costly but result in tendering and otherwise injuring the dyed material. On the other hand, the products containing nitrogen substituents in the anthraquinonyl moiety of the molecule produce black shades directly without the necessity of aftertreatments and are known as direct vat black dyestuffs.

In an effort to produce such jet black shades, it has been proposed to nitrate the dibenzanthrone in various solvents which produce nitrated bodies having nitro groups substituted in the anthraquinonyl and/or in the benz-positions. Thus solvents such as sulfuric acid and chlorosulfonic acid give anthraquinonyl-substituted derivatives, while aqueous nitric acid, nitrobenzene, glacial acetic and phthalic anhydride produce Bz-nitrated derivatives. Further, it has been suggested to reduce the nitro derivative in various ways, as with sodium sulfide, metal powders, and in aqueous or alcoholic media.

These various procedures of the prior art, directed to the improvement in shade and/or fastness characteristics of the desired dyestuffs, all give products which are either too red or too green and thus require shading—that is, admixture with other dyestuffs—to produce the desirable jet black shade. This not only adds to the cost of the finished dyestuff but results in mixtures of dyestuffs which have different dyeing and fastness characteristics.

An object of the present invention is to provide an improved process for the nitration of dibenzanthrones. A further object of this invention is to provide an improved process for the preparation of aminodibenzanthrones. Still antoher object is to provide a process for preparing aminodibenzanthrones which dye vegetal fibers direct black shades of superior jetness and fastness to peroxide bleach aftertreatment.

Other objects will be apparent from the description which follows.

I have now found that vat dyestuffs which dye vegetal fiber direct black shades of superior jetness and fastness to peroxide aftertreatment when applied by dyeing and printing processes are obtained according to my invention, by nitrating a dibenzanthrone compound in sulfuric acid solution with a nitrate, in the presence of vanadium or molybdenum metal or an acid-soluble salt of vanadium or molybdenum, for example an alkali metal or ammonium salt of metavanadic acid or molybdic acid. If desired, the nitration product may be subsequently isolated from the acid solution and the isolated product reduced to the aminodibenzanthrone derivative in a manner known in the art, or the nitro product may be added as such to the dyebath, where it is reduced to the amino compound during the dyeing operation as is well known.

I have further found that the above vanadium and molybdenum compounds appear to be unique in their ability to impart the advantages of superior jetness and bleach fastness, as I found in my studies that nitration in the presence of other metallic salts including those of mercury, nickel, cobalt, manganese, chromium, copper, aluminum, cadmium, zirconium, titanium, thorium, iron, antimony and tin, produce no appreciable improvements in jetness or fastness to peroxide after-bleach in the resulting dyestuffs.

The quality of "jetness" possessed in high degree by the compounds prepared according to my invention can be evaluated by preparing sample dyeings on cotton yarn or fabric and comparing the shade of the so dyed sample with that of a sample dyed with a standard material, and observing the relative brightness of the samples. Brightness is the inverse of "jetness" so that the less bright the sample the more "jet" is the dyestuff. Additionally, the samples are evaluated for their predominant redness or greenness of shade, it being desirable that neither shade predominate to the extent that admixture with other dyestuffs is required to give the desired jet black shade.

Peroxide bleach fastness is important, since the trade normally applies a black vat dye of this type to "gray" (unbleached) goods, e.g. toweling, etc., to produce adjacent white and black areas. The "gray" goods, after being colored, are subjected to a bleaching treatment with peroxide to whiten the undyed portions of the goods. Accordingly, it is essential that the color does not bleed and/or stain the white areas or undergo an alteration of shade by such peroxide bleach treatment. The trade has recently shown an increasing preference for hydrogen peroxide rather than hypochlorite as the bleach, since peroxide tenders the fabric less than hypochlorite, and consequently fastness to the former agent has become an important attribute of dyestuffs in this class.

The test used for evaluating resistance to such peroxide bleaching is the "Standard Test Method for Color-Fastness to Peroxide Bleaching," described on page 87 of the 1958 Technical Manual of the American Association of Textile Chemists and Colorists. Staining is evaluated by means of the AATCC Chart for Measuring Color, described on page 82 and rated as follows.

| AATCC rating: | Color changes |
|---|---|
| 5 | Nil. |
| 4 | Slight. |
| 3 | Appreciable. |
| 2 | Considerable. |
| 1 | Heavy. |
| 0 | Very heavy. |

As used herein, the term "dibenzanthrone" includes dibenzanthrone, isodibenzanthrone and also the halogen, lower alkyl and lower alkoxy derivatives of these compounds.

The process of my invention proceeds according to the following equations:

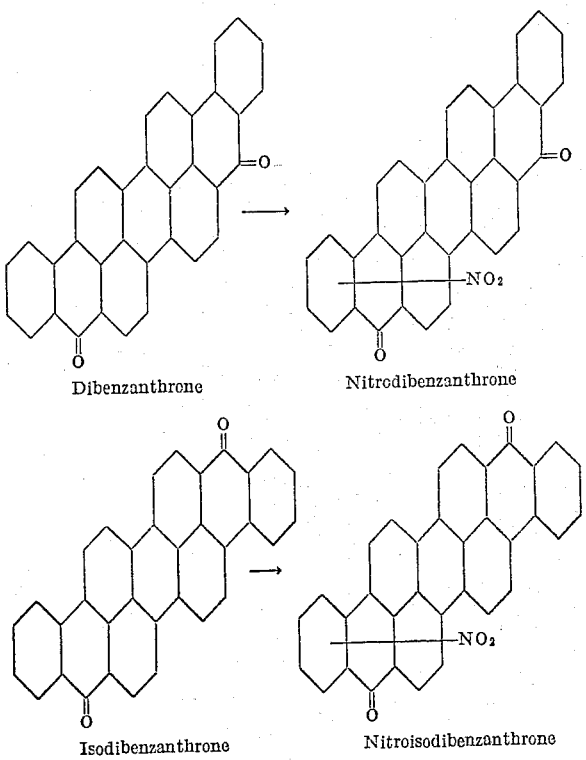

Dibenzanthrone → Nitrodibenzanthrone

Isodibenzanthrone → Nitroisodibenzanthrone in which the dibenzanthrone and isodibenzanthrone may be substituted by halogen, lower alkyl or lower alkoxy as indicated above, and wherein the single nitro group is directed to one of the anthraquinonyl portions of the molecule.

The following procedure illustrates the application of my invention. The dibenzanthrone compound is dissolved in concentrated sulfuric acid and the solution is cooled. To the solution are added a catalytic quantity of the vanadium or molybdenum metal or an acid soluble salt thereof and the nitrating agent. The mass is allowed to react under agitation for a sufficient time to cause addition of a single nitro group to the dibenzanthrone structure. The mixture is then brought to ambient temperature, the acid solution is drowned in water, the solid nitrodibenzanthrone product is filtered, and the filter cake washed acid free. The solid nitrodibenzanthrone product may then be slurried in water, for example, about five times its weight of water, heated to just below boiling, and treated with a reducing agent to convert the nitro group to the corresponding amino group. The solid aminodibenzanthrone product may then be separated as by filtration.

Although the exact mode of action of the vanadium and molybdenum compounds is not entirely clear, it is believed that they function in my process as catalysts directing the introduction of the nitro groups into the anthraquinonyl nuclei rather than into benz-positions. Dyestuffs produced according to prior art nitrations require admixture with other dyes to obtain jetness of shade, which may indicate that the substituent groups are, to some degree at least, in the benz-positions. I have also found that by using the molybdenum or vanadium directive catalyst of this invention, the dyestuff produced is more soluble in the dye bath, i.e., the "Franklin Process solubility" is greater than that of the dyestuffs produced by a process similar in all respects except for omission of these catalysts. The fastness to peroxide bleach of dyeings also is improved by carrying out the nitration of dibenzanthrone compounds in the presence of my molybdenum or vanadium directive catalysts, further supporting the theory that these catalysts function to direct the nitro group into the anthraquinonyl nuclei.

Catalysts used in my invention may be metallic vanadium and molybdenum, or any sulfuric acid soluble salt thereof. Especially suitable are salts of metavanadic and molybdic acids, preferably the alkali metal including ammonium salts of these acids, and such salts of metavanadic acid are especially preferred. The effectiveness of vanadium and molybdenum in the metallic state is probably due to the formation of the corresponding sulfates on contact of the metal with the sulfuric acid. The amount of such catalysts used can be varied over a broad range. Amounts as small as about 0.01 part by weight per part of dibenzanthrone compound are sufficient to produce noticeably marked improvements. Preferably, between about 0.02 and about 0.05 part and especially 0.03 to 0.04 part of catalyst will usually be used. Larger amounts do no harm but are wasteful since they offer no additional readily discernable improvement in yield or quality of product obtained.

Various dibenzanthrone compounds may be treated according to my process to obtain dyestuffs having the improved characteristics indicated, thus dibenzanthrone, isodibenzanthrone, and also the several halogenated, lower alkyl and lower alkoxy derivatives are suitable. Among the various dibenzanthrone compounds which can be processed to improved forms of direct black vat dyestuffs, the following are mentioned as typical examples:

Dibenzanthrone            Mono methyl dibenzanthrone
Isodibenzanthrone         Chloroisodibenzanthrone
Monochlorodibenzanthrone  Dibromoisodibenzanthrone
Dibromodibenzanthrone     Fluoro-isodibenzanthrone
Dichlorodibenzanthrone    Dimethoxydibenzanthrone Use of either pure or crude dibenzanthrone compounds will produce dyestuffs which provide cotton dyeings of superior "jetness." For obtaining dyestuffs of a high degree of fastness to peroxide after-bleaching, however, the dibenzanthrone compounds used are preferably those which are substantially free of non-vattable impurities especially such compounds as have been purified by vatting with aqueous sodium hydrosulfite, filtering the "leuco" solution thus obtained to remove non-vattable impurities, and oxidizing the filtrate to regenerate the dibenzanthrone compound, which can be separated by filtration. Other types of impurities such as inorganic contaminants, appear to do no harm.

Sulfuric acid is used in the nitration step of this process as a solvent. Although 100% sulfuric acid is the preferred solvent, any concentrated sulfuric acid may be used, and aqueous sulfuric acid as low as 75% concentration can be used with equivalent results. The amount of acid used can be varied over a fairly broad range. As little as 5 parts of acid per part of dibenzanthrone compound by weight is sufficient. Preferably from 8 to 12 parts of acid are used. Larger amounts of acid do no harm but provide no benefits and would not only be wasteful of the acid but also would, by reducing the useful capacity of the equipment, adversely affect the economy of the process.

The nitration step can be carried out over a range of temperatures of from about 0° C. to about 75° C. depending upon the concentration of the acid, the more dilute acid requiring the higher temperatures. Preferably a temperature of between 15° and 30° C. is used with 100% acid. Lower temperatures increase the time required to obtain complete nitration as indicated by bluer shades of the finished dyestuff, whereas temperatures exceeding about 75° C. result in progressively lower yields and deterioration in the peroxide bleach fastness of the finished dyestuff. The more dilute the acid the higher may be the nitration temperature, as indicated above, but even when 75% sulfuric acid is used, the temperature should not exceed about 75° C. The nitration step is usually complete in a period of between about 2 hours and about 10 hours, depending upon the temperature of the reaction, the higher temperature requiring the lesser time.

As the nitrating agent either strong nitric acid or a nitrate which liberates nitric acid in the presence of sulfuric acid may be used in my process, preferably an alkali metal nitrate or ammonium nitrate. Because of its ready availability and reasonable cost, sodium nitrate is especially preferred. Strong nitric acid, such as fuming nitric acid, can be used and is considered to be the equivalent of the solid nitrate such as sodium nitrate. On addition of a solid nitrate to sulfuric acid, nitric acid is generated and it is believed this is the reactive form. The amount of nitrate used should be at least an amount sufficient for mononitration. Preferably between about 0.20 and about 0.50 mol in excess of the stoichiometric requirement for mononitration will be used. This corresponds to a weight ratio of dibenzanthrone:sodium nitrate from about 0.22 to about 0.28. The optimum amount appears to be about 0.25 part of sodium nitrate per part of pure dibenzanthrone by weight. If crude or impure dibenzanthrones which contain nitratable impurities are used, larger quantities of nitrate will be required to provide for consumption by such impurities. Larger amounts of nitrate than the maximum indicated above produce increasingly greener shades of lower tinctorial value and progressively poorer peroxide bleach fastness. Lesser amounts of nitrate than the indicated minimum result in a product of redder shade and necessitate the admixture of shading components to produce direct vat black shades of acceptable jetness.

Nitration conditions are maintained until nitration is substantially complete. This can be determined by removing a sample quantity of the mixture isolating the product from the sample by drowning in water and dyeing cotton swatches with the isolated product. The shade of the dyed swatch is compared to the shade of a swatch dyed with a standard dyestuff. Alternatively, a sample quantity of the nitration mixture can be diluted with sulfuric acid and compared spectrophotometrically with a standard. The nitration step normally requires about 2 to 10 hours, depending upon the temperature at which the reaction is carried out.

The nitrated dibenzanthrone compounds as produced in my process can be used per se in vat dyings to produce the jet blacks of improved characteristics and in these respects are substantially equivalent to the corresponding amino derivative. In most cases, however, it is advantageous to reduce them to the corresponding amino compounds, as dyeings made from the nitro bodies undergo somewhat greater shade alteration on bleaching with peroxide. Moreover, when the nitrated dibenzanthrone is used as a vat dyestuff, the nitro group is reduced to the amino group during the vatting procedure, and this increases the consumption of hydrosulfite required for the vatting operation. Furthermore, the solubility of the nitro derivative in the dye bath is inferior to that of the amino body. Accordingly, it is in the interest of providing a superior product in an economical manner to carry out the reduction as a separate step of the dyestuff manufacturer.

The reduction of nitrodibenzanthrone compounds to the corresponding amino compound is well known in the art. Various reducing agents such as sodium sulfide, sodium sulfhydrate, metal powders, e.g. aluminum powder, hydrogen in the presence of catalysts and the like can be used. It is preferred, however, to reduce the nitro compounds prepared according to my invention in aqueous suspension with sodium sulfhydrate. Substantially greater yields of reduced product are obtained in this manner. Sodium sulfide tends to give not only lower yields but also slimy products which are difficult to filter, while aluminum in acid media as the reducing agent gives lower tinctorial yields. Accordingly, it is preferred to reduce the nitrodibenzanthrone compound with sodium sulfhydrate.

The process of my invention is illustrated by the following specific examples. Parts are by weight and temperatures are given in degrees centigrade, except as otherwise noted.

EXAMPLE 1

*Dyestuff A*

A mixture of 475 parts of 100% $H_2SO_4$ and 50 parts of crude dibenzanthrone containing about 60% dibenzanthrone, the major portion of the remainder being nitratable impurities, was agitated at room temperature until the solids were completely dissolved. 2 parts of ammonium molybdate were slowly added and ½ hour thereafter, 12.5 parts of sodium nitrate crystals, and the solution was further agitated for 4 hours at 20–25°. Dry air was then bubbled through the mass to sweep out nitric oxides, and then 2 parts of sulfamic acid were added to eliminate excess nitrogen oxides. The mass containing nitrodibenzanthrone was cooled to 0–10°, charged with 13 parts of aluminum bronze powder, agitated at 0–10° for 2 hours to reduce the nitrodibenzanthrone to the corresponding aminodibenzanthrone, and warmed to room temperature. The thick slurry thus obtained was drowned in 1500 parts of hot (65°) water, and the resulting slurry was heated to 100° to dissolve the excess aluminum, diluted further to 10% acidity, and filtered. The cake was washed acid free with water, then with dilute aqueous NaOH, then alkali free with water and the resulting aminodibenzanthrone dyestuff was dispersed with a formaldehyde condensation product of β-naphthalene sulfonate type dispersing agent (Tamol).

*Dyestuff B*

The foregoing example was repeated using 2 parts of ammonium metavanadate in place of ammonium molybdate.

Both dyestuffs A and B dyed cotton a jet black comparable in color to a standard nitrodibenzanthrone dye of commerce.

EXAMPLE 2

Two hundred parts of a paste of dibenzanthrone which had been purified by vatting with aqueous sodium hydrosulfite, filtering the "leuco" solution thus obtained to remove non-vattable impurities and oxidizing the filtrate to regenerate the dibenzanthrone substantially free from non-vattable impurities, and which contained 182 parts of 100% dibenzanthrone, were mixed with 2020 parts of 100% sulfuric acid and the mixture was agitated at ambient temperature (about 25°) until the solids had dissolved completely. The mass was cooled to between 0° and 5°, and in succession 4 parts of ammonium metavanadate and 48 parts of sodium nitrate were dissolved in the solution. The agitation was continued at 0° to 5° for 2 hours thereafter. The mass was permitted to warm up to ambient temperature (about 20° to 25°) and was agitated thereat for 1 to 2 hours to complete the nitration of the dibenzanthrone. The mass then was drowned in 600 parts of hot (65°) water. The resultant slurry was diluted to 10% $H_2SO_4$ acid concentration with cold (ca. 15–20°) water, filtered, and the nitrodibenzanthrone cake was washed with water until acid free.

The filter cake of nitrodibenzanthrone was added to a hot (65° to 70°) solution of 200 parts of sodium sulfhydrate in 8000 parts of water. The slurry was agitated, heated to and maintained at 95° to 100° for 2 hours. The slurry then was filtered and washed alkali- and sulfide ion-free with water.

The resulting aminodibenzanthrone dyed cotton fibers a jet black shade which was exceptionally fast to peroxide bleach aftertreatment, and which had a shade of considerably lesser brightness, i.e. greater "jetness" than that produced by a commercially acceptable jet black aminodibenzanthrone dyestuff.

EXAMPLE 3

When procedure of Example 2 is repeated except that 200 parts of isodibenzanthrone in paste form containing 183 parts of isodibenzanthrone is used in place of the dibenzanthrone and 52 parts of potassium nitrate is used instead of sodium nitrate, the resulting aminoisodibenzanthrone product dyes cotton fibers a jet black shade fast to peroxide bleach aftertreatment.

EXAMPLE 4

When the procedure of Example 2 above is repeated using dibromodibenzanthrone in place of dibenzanthrone and using ammonium molybdate as nitration catalyst, an aminodibromodibenzanthrone dyestuff is produced which dyes cotton fibres a jet black shade, fast to peroxide bleach aftertreatment.

EXAMPLE 5

When procedure of Example 2 above is repeated using 2200 parts of 66° Bé. sulfuric acid (96% concentration) and a temperature during nitration of 30° to 45°, the resulting aminodibenzanthrone dyestuff dyes cotton fibers a jet black shade which is fast to peroxide bleach aftertreatments.

EXAMPLE 6

Dyestuff A

A mixture of about 500 parts 100% $H_2SO_4$ and 50 parts dibenzanthrone purified to remove non-vattable impurities as described under Example 2 (containing about 45 parts pure dibenzanthrone) was agitated at room temperature until the solids were completely dissolved. Two parts ammonium metavanadate were added and 11 parts $NaNO_3$ were added during 1 hour. The reaction mass was then agitated at 25–35° for 5 hours, drowned in 500 parts of hot (65°) water, diluted with water to 10% acidity and filtered. The nitrodibenzanthrone filter cake (340 parts) was mixed with a formaldehyde condensation product of β-naphthalene sulfonate as dispersing agent (3 parts) and dyed in standard manner on cotton yarn, resulting in a black shade of high jetness.

Dyestuff B

Another experiment was carried out in identical manner except that no ammonium metavanadate was added.

The dyeings produced with Dyestuff B were rated much redder and considerably brighter than those obtained with Dyestuff A. The dyestuff made by use of vanadium was considerably jetter than the comparative Dyestuff B.

It can thus be seen that an improved process for the preparation of direct black vat dyestuffs of the dibenzanthrone series having the desirable jetness of shade and excellent fastness to peroxide bleach has been devised.

The examples given above are illustrative of some of the variations permissable in the novel process. Other modifications can be made in the reactants, conditions and procedures as have been indicated above without departing from the scope and spirit of my invention.

I claim:
1. In a process for producing direct black vat dyestuffs by nitrating a dibenzanthrone compound selected from the group consisting of dibenzanthrone, isodibenzanthrone and the halogen, lower alkyl and lower alkoxy derivatives thereof, with a nitrate in a solvent consisting essentially of concentrated sulfuric acid, and reducing the resulting nitro compound to the corresponding amino compound, the improvement which consists in carrying out said nitration to the extent of at least about mono-nitration and to not more than 50% in excess thereof, at temperatures below about 75° C. in the presence of catalytic quantities of a member selected from the group consisting of vanadium and molybdenum metals and sulfuric acid-soluble salts thereof.

2. The process according to claim 1 wherein the dibenzanthrone compound is dibenzanthrone and the nitration temperature is between about 0° C. and about 75° C.

3. The process according to claim 2 wherein the catalyst is ammonium metavanadate.

4. The process according to claim 1 wherein the dibenzanthrone compound is isodibenzanthrone.

5. The process according to claim 1 wherein the catalyst is ammonium molybdate.

References Cited in the file of this patent

UNITED STATES PATENTS

| | | |
|---|---|---|
| 2,831,871 | Robinson | Apr. 22, 1958 |

FOREIGN PATENTS

| | | |
|---|---|---|
| 622,173 | Germany | Nov. 21, 1935 |
| 585,560 | Great Britain | Feb. 11, 1947 |